US006986012B2

(12) United States Patent
Li et al.

(10) Patent No.: US 6,986,012 B2
(45) Date of Patent: Jan. 10, 2006

(54) METHOD AND SYSTEM FOR READING DATA FROM AND WRITING DATA TO A MEMORY

(75) Inventors: Hong Li, Eindhoven (NL); Nicolaas Lambert, Eindhoven (NL); Robert Jochemsen, Eindhoven (NL); Rudi Jozef Marie Wijnands, Eindhoven (NL); Ozcan Mesut, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 239 days.

(21) Appl. No.: 10/233,450

(22) Filed: Sep. 3, 2002

(65) Prior Publication Data

US 2003/0051116 A1    Mar. 13, 2003

(30) Foreign Application Priority Data

Sep. 3, 2001    (EP)    ................................ 01203292

(51) Int. Cl.
*G06F 12/00*    (2006.01)

(52) U.S. Cl. .................................................... 711/167

(58) Field of Classification Search ................ 711/167
See application file for complete search history.

(56) References Cited

FOREIGN PATENT DOCUMENTS

| EP | 0795813 A2 | 9/1997 |
|----|------------|--------|
| EP | 0880136 A2 | 11/1998 |
| WO | 0075923 A1 | 12/2000 |

OTHER PUBLICATIONS

Microsoft Computer Dictionary, 1999, Microsoft Press, Fourth Edition, p. 357.*

* cited by examiner

*Primary Examiner*—Mano Padmanabhan
*Assistant Examiner*—Midys Rojas

(57) ABSTRACT

The invention relates to a method of writing data to and reading data from a memory (102) by a host. By limiting processing time, time restrictions regarding the data to be processed can be met. However, this is at the expense of data integrity. By setting time limits for a group (300) of multiple processing assignments and dynamic allocation of time, reserved for error recovery and retries, data integrity can be improved, while time limits can still be met. Furthermore, by attaching priorities to the assignments, multiple types of data can be handled in one group of assignments. For example, assignments with real-time requirements can be put in a group with assignments with best effort requirements. In this way, more flexible planning of processing assignments is possible. The invention also relates to a system for writing data to and reading data from a memory.

15 Claims, 5 Drawing Sheets

Figure 3A:
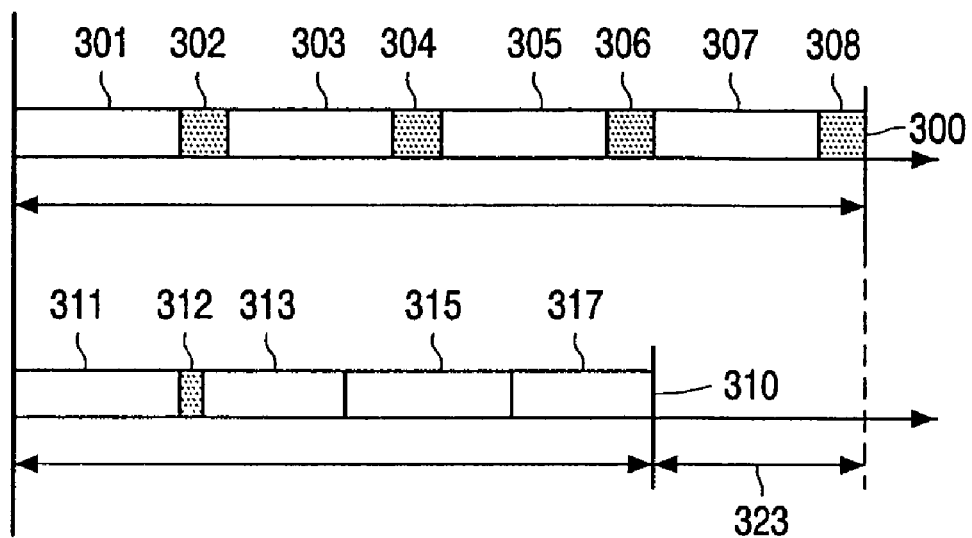

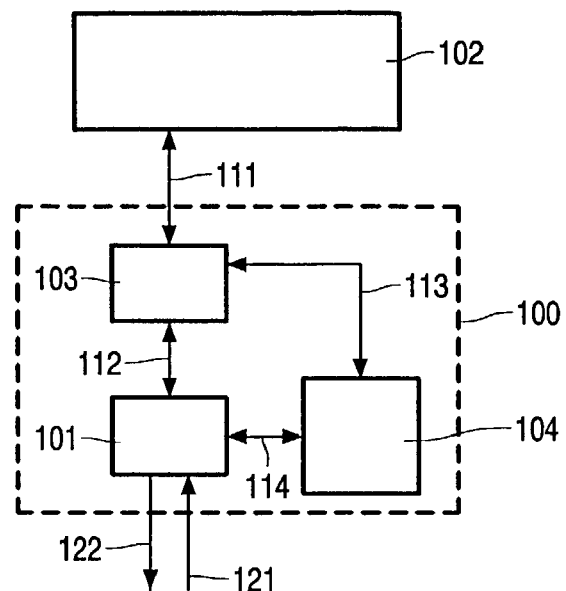
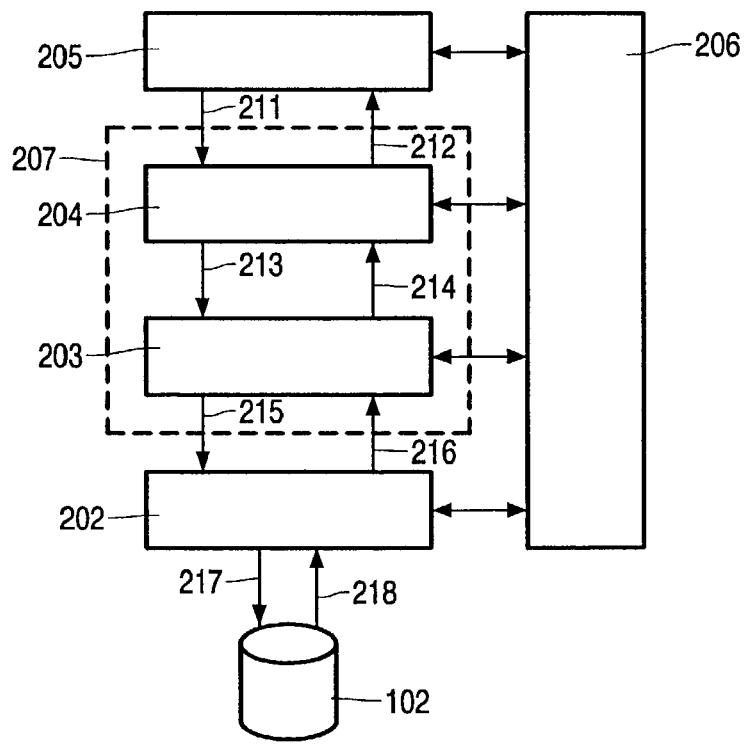
FIG. 1
FIG. 2

METHOD AND SYSTEM FOR READING DATA FROM AND WRITING DATA TO A MEMORY

The invention relates to a method of reading data from a memory and writing data to a memory by means of a host, in which an available time for performing a processing assignment is limited by the host.

The invention also relates to a system comprising a host and a memory, in which the host is adapted to write data to the memory and read data from the memory, and in which the system is adapted to limit an available time for performing a processing assignment.

WO 00/75923 discloses a method of supplying data to a host computer by means of a hard-disk drive system. This method comprises the steps of establishing whether a read/write assignment by the host computer concerns audiovisual data, and of limiting the number of available recovery attempts during performance of the assignment if the assignment concerns audiovisual data.

The number of available recovery attempts is eliminated because the host gives a time limit within which the assignment should be completed. In this way, each assignment is assigned a time unit in which errors can be recovered. Not every assignment will need this time unit. In addition, further assignments may need more time to restore errors. The drawback of this method is, on the one hand, that the bandwidth of the hard-disk drive system is not optimally used and, on the other hand, is at the expense of the integrity of the data.

It is an object of the invention to improve the use of bandwidth of the hard-disk drive system.

This object is achieved by means of the method according to the invention in that the available time is the sum of a first time unit planned for processing the assignment, and a second time unit made available for recovering processing errors, the second time unit being made available for a group of processing assignments comprising said processing assignment.

By means of a dynamic allocation of time for error recovery, this time is used optimally. If no errors occur when an assignment is being processed, the time for recovering errors is automatically available for the next assignment of the group of processing assignments. This has the advantage that the time available for recovering errors is optimally used. On the one hand, an extra time unit for error recovery need not be allocated to each processing assignment. This has the advantage that the bandwidth of the memory is better utilized. On the other hand, the time available for error recovery and not used by a previous assignment may be used for recovering errors which occur during a subsequent assignment. This has the advantage that the integrity of data regarding the next assignment can be enhanced.

An embodiment of the method according to the invention is characterized in that the second time unit is recomputed after at least one of the processing assignments of the group of processing assignments has been completed.

In fact, the first time unit is a planning within which the assignment will certainly have been processed because the first time unit in this embodiment is computed on the basis of the guaranteed bitrate of the hard-disk drive system, which is a worst case approximation. In this way, it is possible that the time unit within which the assignment has been processed is shorter than the first time unit. By using the difference between the two time units for further assignments for recovering processing errors by adding this difference to the second time unit, the time available for error recovery is longer. This has the advantage that the integrity of the data to be processed can be enhanced without the processing of the group of processing assignments taking more time.

An embodiment of the method according to the invention is characterized in that a priority level is coupled to at least one of the processing assignments. This has the advantage that a plurality of types of data can be processed in a group of processing assignments.

An embodiment of the method according to the invention is characterized in that the priority level comprises one of the following classifications: a first priority at which the requested assignment should be completed within a predetermined time, and a second priority at which the requested assignment should be completed without errors. This embodiment of the method according to the invention has the advantage that, for example, assignments relating to audiovisual data with a real-time character as well as assignments relating to a file whose data integrity is important can be planned in a group of processing assignments. This has the advantage that the memory can be used in a more flexible way.

An embodiment of the method according to the invention is characterized in that, if a processing assignment of the second priority is not faultlessly completed within a third time unit, which is equal to the sum of the first time unit and the second time unit, the relevant processing assignment is planned in a further group of processing assignments. Data integrity is a first requirement for processing assignments of the second priority. If processing errors occur when processing assignments of the second priority, the memory will have to retry to recover the errors. This may take several seconds, for example, in a hard-disk drive system. In the meantime, no other processing assignments can be processed. By postponing assignments of the second priority, at which errors occur during processing, to a subsequent group of processing assignments, the hard-disk drive system is available again for other processing assignments, and processing errors which occurred during processing of the assignment of the second priority can be solved again. This embodiment of the method according to the invention has the advantage that, on the one hand, the system is not occupied for an unacceptably long time by repeated attempts to recover processing errors and, on the other hand, the integrity of data regarding assignments of the second priority is guaranteed.

An embodiment of the method according to the invention is characterized in that, if a processing assignment of the second priority is not faultlessly completed within a third time unit, which is equal to the sum of the first time unit and the second time unit, the error recovery of the relevant processing assignment of the second priority is planned in a further group of processing assignments. This method according to the invention has the advantage that data regarding the processing assignment of the second priority, during which at least one processing error has occurred and which has been processed without processing errors does not need to be processed again in a subsequent group of processing assignments. Instead, only the data which is not processed by a processing error is to be processed. In this way, only the recovery of the processing error is to be postponed to a subsequent group of at least one processing assignment. This has the advantage that the bandwidth of the memory is better utilized.

The system according to the invention is characterized in that the system is further adapted to compute the available time by taking the sum of a first time unit, planned for processing the processing assignment, and a second time unit made available for recovering processing errors, the system being further adapted to make the second time unit available for a group of processing assignments, the group comprising said processing assignment.

These and other aspects of the invention are apparent from and will be elucidated with reference to the embodiments described hereinafter.

Figure 3B:
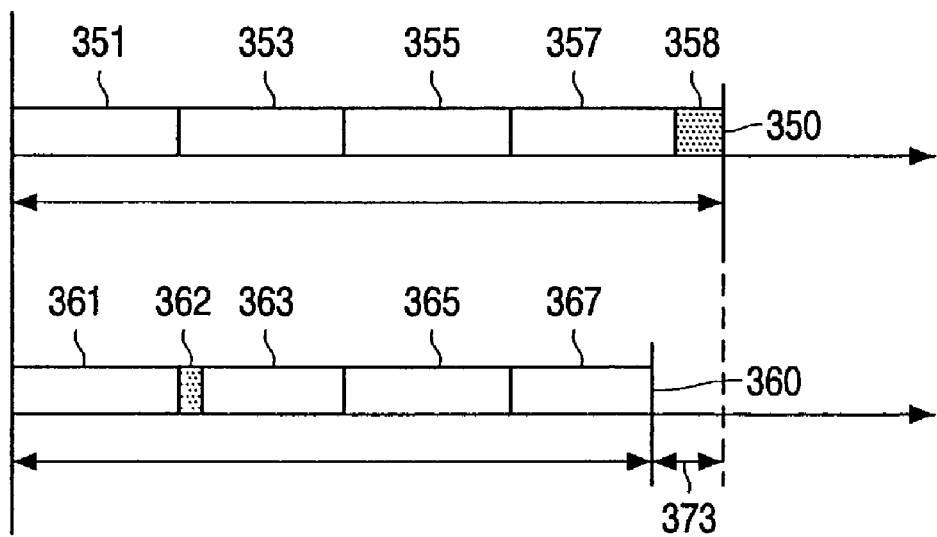
Figure 4:
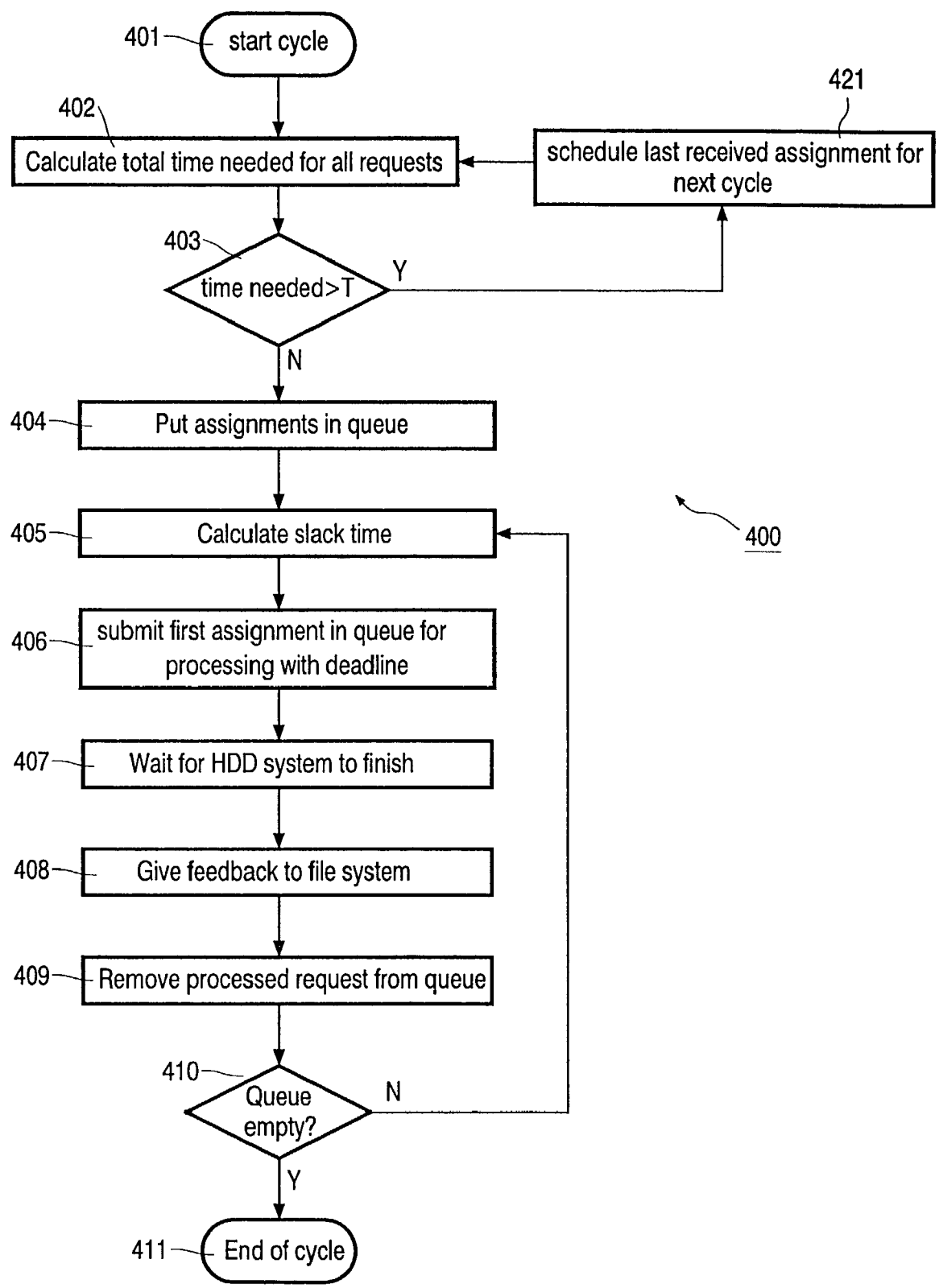
Figure 5:
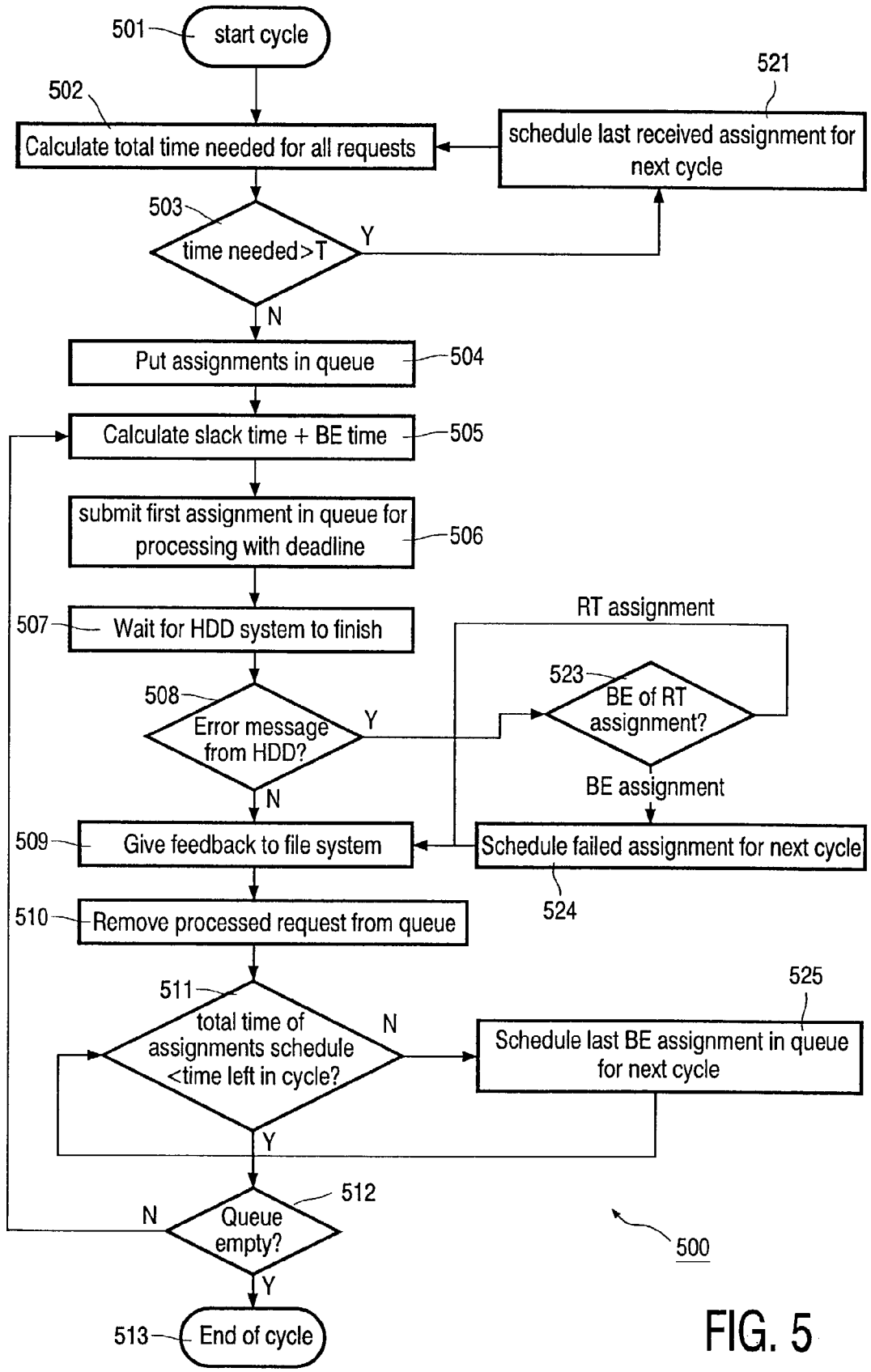

In the drawings:

FIG. 1 shows an embodiment of the system according to the invention,

FIG. 2 shows a drive structure of an embodiment of the system according to the invention, FIG. 3A is an illustration of the method in accordance with the prior art, FIG. 3B is an illustration to support an advantage of the method according to the invention, FIG. 4 is a flow chart of an embodiment of the method according to the invention, FIG. 5 is a further flow chart of an embodiment of the method according to the invention, FIGS. 6A–6G are illustrations to support a further processing flow of an embodiment of the method according to the invention.

FIG. 1 shows a system 150 as an embodiment of the invention, comprising a host 100 and a hard-disk system 102. The host comprises a processing unit 101, a DMA (Direct Memory Access) controller 103 and a memory 104. The host 100 communicates with the hard-disk system 102 by means of the DMA controller 103 via a first bidirectional connection 111. The DMA controller 103 further communicates with the processing unit 101 via a second bidirectional connection 112 and with the memory 104 via a third bidirectional connection 113. The processing unit 101 and the memory 104 are connected via a fourth bidirectional connection 114. The host 100 receives commands and information via an input channel 121 which is connected to the processing unit 101. The host 100 outputs information via an output channel 122 which is connected to the processing unit 101.

The system 150 is adapted to store information presented via the input channel 121 in the hard-disk system 102 and to present information stored on the hard-disk system 102 via the output channel 122. The information may consist of streams of audiovisual information, files—texts and the like—or a combination of both. A possibility of application of the system 150 is a PC. However, it is alternatively possible to use the system 150 in a digital video recorder (DVR).

FIG. 2 shows a drive structure 200 with which the system 150 (FIG. 1) is driven in the embodiment shown. The upper layer of the drive structure 200 is constituted by an application 205 which is performed on the host 100 (FIG. 1). A file system 204 is present underneath the application 205. The application 205 communicates with the file system 204 by means of a first application programming interface (API) 211, and the file system 204 communicates with the application 205 by means of a first feedback channel 212. If the application 205 requests information, the file system 204 provides this information in the format of a file or a stream of audiovisual information. If the application 205 requests storage of a file or a stream of audiovisual information in the hard-disk system 102 (FIG. 1), the file or the stream of audiovisual information is presented to the file system 204 which takes care of further processing.

In the drive structure 200, a scheduler 203 is situated underneath the file system 204. The scheduler 203 receives requests for retrieving information from the hard-disk system 102 or storing information in the hard-disk system 102 via a second API 213 of the file system 204. Subsequently, assignments for retrieving the information from the hard-disk system 102 or storing information in the hard-disk system 102 are planned by the scheduler 203 in the form of cycli. The cycli consist of assignments for retrieving parts of the requested information sequentially from the hard-disk system 102, or of assignments for storing parts of the presented information sequentially in the hard-disk system 102. A combination of read and write assignments is also possible.

The scheduler 203 gives the assignments in the cycle to the hard-disk system 102 via a driver 202. The scheduler 203 communicates with the driver 202 via a third API 215, and the driver 202 communicates with the scheduler 203 via a third feedback channel 216.

The driver 202 subsequently communicates with the hard-disk system 102 via a fourth API 217. In the embodiment shown, this communication takes place in accordance with the ATA-6 protocol. The hard-disk system 102 communicates with the driver 202 via a fourth feedback channel 218.

The activities of the application 205, the file system 204, the scheduler 203 and the driver 202 are co-ordinated by a drive system 206 which communicates with all of the three layers of the drive structure 200.

In the embodiment shown, the drive structure 200 is implemented in software stored in the memory 104. However, it is alternatively possible to implement the drive structure as a ROM code on a separate IC.

Now it is possible that the hard-disk system 102 (FIG. 1) encounters an error when information is being read from or written to the hard disk itself (not shown). Conventional hard disks will attempt to recover the error until the error has been solved, or until all pre-programmed recovery procedures have been exhausted. The reason is that the integrity of data in many applications such as text processing on a PC, is more important than supplying the requested information in time. If the error cannot be recovered by means of pre-programmed recovery procedures, the conventional hard disks give an error message. This total process may take several seconds. In this period of time, the hard-disk system 102 cannot perform any other assignments.

If the system 150 (FIG. 1) is used in a DVR apparatus, the information requested by the host 100 (FIG. 1) from the hard-disk system 102 (FIG. 1) will often consist of one or more streams of audiovisual information. The same applies to information presented by the host 100 (FIG. 1) to the hard-disk system 102 (FIG. 1) for storage on the hard-disk system 102. It is alternatively possible that the system 150 (FIG. 1) is given an assignment for storing information in the hard-disk system 102 (FIG. 1) as well as an assignment for retrieving information from the hard-disk system 102. Audiovisual information is presented in a continuous stream so that it is necessary that the system 150 (FIG. 1) processes this information in real time.

In one embodiment of the invention, it is possible that the system 150 is connected by means of the output channel 122 to a display device (not shown) and sends audiovisual information, stored in the hard-disk system 102 by the system 150, to the display device for displaying this audiovisual information to a user. If the hard-disk system 102 now encounters an error when reading information, this may lead to a drop-out of the picture, when a hard error is concerned—that is to say, when there is really an error on the hard disk itself—and the hard-disk system will continue to try to recover this error. Also in the case of a soft error—badly written data—it is possible that the processing of an error may take a long time. As stated hereinbefore, the time used for this purpose may increase to several seconds in conventional hard-disk systems. This is not desirable because a user of the system 150 (FIG. 1) will then miss a considerable piece of the stream of audiovisual information. The presentation of the stream of audiovisual information with a small error is preferred to not presenting a part of the stream of audiovisual information. The integrity of the information is thus of subordinate importance in the case where audiovisual information is concerned. Moreover, the supply of information to other applications is also interrupted at the moment when the hard-disk system 102 is busy for a long time to recover an error until all pre-programmed procedures have been exhausted. It is therefore preferred to limit the time assigned to a hard disk for a satisfactory supply of data. This is possible with the ATA-6 standard for hard-disk systems. In the presented embodiment of the invention, this function is used in scheduler 203 (FIG. 2).

The way in which the scheduler in accordance with the presented embodiment of the invention operates will now be described with reference to FIG. 2, FIG. 3A and FIG. 3B. If processing of information is mentioned, it is understood to mean reading of information from the hard-disk system 102 and/or storing information in the hard-disk system 102.

FIG. 3A shows how the scheduler 203 plans different assignments of the file system 204 for execution by the hard-disk system 102. In the presented embodiment of the invention, it has been assumed that the hard-disk system 102 of the host 100 (FIG. 1) receives processing assignments which relate to a plurality of streams of audiovisual information.

If the scheduler 203 plans a period of recovering an error for each processing assignment, which period suffices for about two recovery attempts, and if a total of four streams of audiovisual information must be processed, a planning for processing information can be presented as a first cycle planning 300 in FIG. 3A.

One way of determining the total time of the first cycle planning 300 is given by relation (1). In this relation, $T_C$ is the computed total time of the cycle planning, $r_{HDD}$ is the guaranteed bitrate of the hard-disk system 102, M is the total capacity of the memory 104 (FIG. 1), $\alpha$ is a natural number and $T_{err}$ is the time required for a recovery error attempt. In one embodiment of the invention, $T_{err}$ is the minimal time required to recover an error, i.e. the time required for one revolution of the hard disk. This is the minimal time required for rereading or rewriting the sector where the read or write assignment has gone wrong.

In this way, $T_C$ is the time in which the memory 104 (FIG. 1) can be filled with information, or the time in which all information in the memory 104 can be stored in the hard-disk system 104. It is, however, preferred to observe a safety margin so as to prevent overflow of the memory. For this reason, the factor $\beta$ is introduced in relation (1). $\beta$ is preferably a real number between 0 and 1. Furthermore, the consumption of the time required for an error recovery attempt is optional, while it is also possible that factor $\alpha$ is equal to 0. $T_{err}$ can be taken to be equal to the time required for a revolution of the disk of the hard-disk system 102 (FIG. 1).

$$\frac{M}{r_{HDD}} \cdot \beta + \alpha \cdot T_{err} = T_C \quad (1)$$

The time $T_i$ needed by the hard-disk system 102 in a cycle for performing an assignment for a stream of audiovisual information (stream i) can be computed with reference to relation (2). In this relation, $T_C$ is the time of a cycle in accordance with relation (1), $r_i$ is the bitrate of the stream of audiovisual information for which an assignment is to be performed, $T_{AC}$ is the (maximum) time required for jumping from one sector to another. This may take a fairly long time and a plurality of revolutions to find the sector (seek time) plus maximally one rotation (rotational latency).

$$T_C \cdot \frac{r_i}{r_{HDD}} + T_{AC} = T_i \quad (2)$$

In a further embodiment, the cycle time $T_C$ may also be computed in a different way. This has been done in relations (3) to (5). Relation (3) indicates the time $T_i$ which is required to perform a processing assignment having a value of $B_i$ with a guaranteed bitrate $r_{HDD}$, taking an access time $T_{AC}$ into account.

$$T_i = T_{AC} + \frac{B_i}{r_{HDD}} \quad (3)$$

Relation (4) gives a possible relation between an assignment quantity $B_i$, a bitrate $r_i$ of the data stream i and the time $T_i$ indicating the planned time of the processing assignment.

$$B_i \geq r_i T_C \quad (4)$$

Furthermore, the cycle time $T_C$ should comply with relation (5). In relation (5), TC is the time of the total cycle, $T_i$ is the times planned for the assignments in the cycle, in which $T_i$ may be determined by means of relation (3). Factor $\alpha$ and $T_{err}$ are determined as explained with reference to relation (1).

$$T_C = \sum_{i=0}^{n} T_i + \alpha \cdot T_{err} \quad (5)$$

For reasons of costs, a small buffer is preferred. Therefore, it is preferred to maintain the assignment quantity $B_i$ relatively small. It will be evident from the relations above that the cycle time $T_C$ must thus be kept short. Moreover, the reaction time of the system 150 (FIG. 1) is also shorter when the cycle time $T_C$ is short.

Furthermore it is also possible to determine the cycle time $T_C$ in the relations above per cycle with reference to the sum of the times $T_i$ planned for completing all assignments.

Since $r_{HDD}$ indicates a lower limit of the bitrate of hard-disk system 102 (FIG. 1), relation (2) indicates an upper limit of the time required to perform the assignment. The allocation of time for two recovery attempts per assignment is too much in many cases. This is shown in the first cycle planning 300 and the cycle 310. As previously stated, the system 150 (FIG. 1) is considered to process four streams of information in the embodiment shown, in which the timeliness of processing information is more important than the integrity. The time of the first cycle planning 300 is split up into four pieces and, in each piece, the time is reserved for processing a piece of information by hard-disk system 102. In the first cycle planning 300, a first time unit 301 indicates the time planned for processing a first assignment. A second time unit 302 indicates the time planned for two recovery attempts for processing possible errors which may occur when processing the first assignment. Furthermore, a third time unit 303 indicates the time planned for a second assignment. A fourth time unit 304 indicates the time planned for two recovery attempts of processing possible errors which may occur when processing the second assignment.

Now, the reservation of time required for two attempts of recovering an error is a worst case approximation per processing assignment. The time reserved for an assignment is also a worst case approximation. In this way, it is possible that the spare time—the time left in a cycle for error recovery—may increase as a larger number of assignments in the cycle has been processed.

Since, as already previously stated, relation (2) gives an upper limit for the time required to perform an assignment, it is possible in practice to perform the first cycle planning 300 as the cycle 310. In the cycle 310, a first time unit 311 represents the time which was actually required to process the first assignment. Furthermore, a second time unit 312 in the cycle 310 represents the time which was required for recovering an error which occurred when the first assignment was processed. In the presented example, one recovery attempt was sufficient to recover the error.

In practice, it appears that the risk of errors when processing information by a hard-disk system is so small that it is not real to reserve time per processing assignment for recovering errors which occur when the processing assignment is processed, if the quantity of information to be processed is relatively small. Since, however, a processing error may occur in each assignment, it is desirable to reserve space for recovering possible errors. This may be space for recovering an error, but for safety's sake it is alternatively possible to reserve space per processing assignment for recovering two processing errors. A different number is of course also possible. As a result, the bitrate of the hard-disk system 102 is not optimally used. In fact, the time planned for the first cycle planning is clearly longer than the time used in the first cycle 310. Consequently, planning for use of the hard-disk system 102 remains unused during a time unit 323.

It is preferred to adapt the time reserved for recovering a processing error to the risk of occurrence of a processing error. If the risk of an error is $10^{-6}$ per bit, one recovery attempt should be planned per megabit of processed information. If the processed information is smaller than $10^6$ bits and one recovery attempt per processing assignment has been reserved, this leads to a less efficient use of the available bandwidth of the hard-disk system 102.

Those skilled in the art know that the above-mentioned approximation is very simplistic and inaccurate because the seek operation—seeking for the correct sector—may also be a source of errors. However, the message is clear to those skilled in the art: the risk of errors for an assignment is considerably smaller when the full spare time (for recovering all processing errors in a cycle) is given along with an assignment, rather than when a fraction of the spare time is given along with each assignment.

In the presented embodiment of the invention, it is therefore proposed to reserve time for recovery attempts per group of processing assignments. This is shown in a second cycle planning 350. In the second cycle planning 350, a first time unit 351 is reserved for performing a first assignment, a second time unit 353 is reserved for performing a second assignment, a third time unit 355 is reserved for performing a third assignment, a fourth time unit 357 is reserved for performing a fourth assignment, and a fifth time unit 358, of which the reserved time corresponds to the time required for two recovery attempts.

Assuming that the four assignments in the second cycle planning 350 are performed as the assignments for the first cycle planning 300, a second cycle 360 shows the way in which the second cycle planning 350 is performed. The planned time which is now not used for performing the assignments, indicated by a time unit 373, is now much smaller than the time unit 323. In the situation shown, the gain consists of the time reserved in the first cycle planning for a total number of seven recovery attempts.

If a processing error occurs when the first assignment is being performed and the hard-disk system needs all the time reserved for error recovery, indicated by the fifth time unit 358, for recovering the processing error, there is no time left to recover processing errors which occur when the second, the third and the fourth assignment are being processed. In that case, the processing errors will not be recovered and the assignments will be further processed. Within the ATA-6 protocol, the command can be given to further process the assignment when there is an error message, in which no attempt is made to recover the error.

An embodiment of the method according to the invention for performing the second cycle planning 350 is shown in FIG. 4. FIG. 4 is a flow chart showing a processing flow 400. In the presented embodiment of the method according to the invention, this method is performed by the processing unit 101 (FIG. 1). The processing flow 400 starts at a start 401 where the file system 204 (FIG. 2) passes on at least one assignment to the scheduler 203 (FIG. 2).

As previously stated, the duration of a cycle is notably determined by the guaranteed bitrate of the hard-disk system 102 (FIG. 1), the seek time (time for seeking a specific sector) and the capacity of the memory 104 (FIG. 1). All processing assignments are to be performed in the duration of a cycle.

Furthermore, the sum of the bitrates of all streams of audiovisual information, for which the hard-disk system 102 (FIG. 1) receives processing assignments, must not be larger than the guaranteed bitrate of the hard-disk system 102. This means that the sum of the times required to perform the assignments of all streams of audiovisual information as computed in accordance with relation (2) must not be longer than the cycle time computed in accordance with relation (1). This is tested in a decision 403. In decision 403, it is tested whether the situation complies with relation (6) after the quantity of the left member of relation (6) has been determined in a process 402. In relation (6), $T_i$ is the time required to process the information for an audiovisual stream of information i in the cycle time as computed in accordance with relation (1), and $T_C$ is the cycle time as computed in relation (1). In relation (6), n is the number of audiovisual streams of information of which information is to be processed. It is of course also evident that the relations (3), (4) and (5) may be alternatively used for computing relation (6). Of course, this does not depart from the scope of the invention.

$$\sum_{i=1}^{n} T_i + \alpha \cdot T_{err} \le T_C \qquad (6)$$

If the situation complies with relation (6), the processing flow 400 proceeds to a process 404. If it appears in the decision 403 that the time required to process all assignments is not shorter than the duration of a cycle, the last received processing assignment is postponed in a process 421 to a subsequent cycle. Subsequently, it is tested once again in the decision 403 whether the time required to process all assignments is shorter than the duration of a cycle. It will of course be evident to those skilled in the art that a different assignment than the last is coupled. This may be done, for example, on the basis of priorities or deadlines, coupled to the processing assignments. In a further embodiment, processing assignments are added to a row in the loop comprising the process 402, the decision 403, the process 422 and the process 421, until the left member of relation (6) is larger than the right member of relation (6), so that the left member of relation (6) is always smaller than the right member of relation (6). The processing assignments are selected from a group of assignments by the file system 204 (FIG. 2), the application 205 (FIG. 2) or the scheduler 204 (FIG. 2). The selection of the assignments takes place on the basis of the priorities given to the processing assignments. In a further embodiment of the invention, the selection of the assignments for the cycle takes place on the basis of the deadline set for a processing assignment.

In the process 404, the assignments to be performed are set in a queue. Subsequently, it is computed in a process 405 how much time the assignments will take up and how much spare time is present in the cycle. The time required for an assignment is determined in accordance with relation (3).

The difference between the sum of the time required for processing the assignments of all streams of information and the duration of the cycle is the spare time. In a further embodiment, a spare time can always be defined in a cycle so as to create time to recover errors. This may be done, for example, by defining a dummy processing assignment.

As previously stated, the factor $\alpha$ in relation (1) can be varied in a further embodiment so as to reserve space in a cycle for processing errors. The factor $\alpha$ may be determined on the basis of experience with the hard-disk system. For example, the factor $\alpha$ may be determined by the manufacturer of the hard-disk system 102 on the basis of experiments. In another embodiment of the invention, it is alternatively possible to determine the factor $\alpha$ on the basis of the performance of the hard-disk system 102 in the ambience of the system 150 (FIG. 1). In this embodiment, the factor $\alpha$ will be larger when the system 150 (FIG. 1) is in an ambience with much vibration, as compared with a situation where the system 150 (FIG. 1) is in an ambience without vibration.

After this computation in the process 405, a first assignment of the queue formed in the process 403 is passed on in a process 406 to the hard-disk system 102 (FIG. 1) for the purpose of processing. As already previously stated, it is possible to give a deadline to a processing assignment in a hard-disk system complying with the ATA-6 standard. In the process 406, a deadline is given along with the first processing assignment. The deadline is equal to the sum of the time reserved for performing the first assignment, and the spare time which is computed in the process 405. If the assignment has been processed without an error, the hard-disk system 102 (FIG. 1) will be ready with the processing operation within the deadline that has been set. However, if at least one error occurs when the first assignment is being processed and the time for recovering the error plus the time required to process the assignment is larger than the deadline set in the process 405, the hard-disk system 102 (FIG. 1) will discontinue processing of the assignment when the deadline is reached. After the scheduler 203 (FIG. 2) has given the assignment to the hard-disk system in the process 406, the processing flow 400 waits in a process 407 until the hard-disk system has finished the assignment. Subsequently, feedback is given to the file system 204 (FIG. 2) in a process 408. This provides, inter alia, the possibility of finding out whether the assignment has been processed successfully. If errors have occurred during processing of the assignment, feedback can be given on whether errors have occurred and how the location and number of errors that have occurred can be determined. If the processing assignment dealt with was a reading assignment, the information that has been read will also be fed back to the file system 204 (FIG. 2). Subsequently the completed assignment is removed in a process 409 from the queue formed in the process 404. After the process 409, it is tested in a decision 410 whether the queue formed in the process 403 and changed in the process 409 is empty. If this is the case, the processing flow 400 ends at an end point 411. If the queue is not empty, the processing flow 400 proceeds to the process 405.

Until now, the processing of time-critical assignments has been discussed, i.e. assignments in which timeliness of processing information is more important than integrity of the processed information. However, it is alternatively possible that the processing assignments for the hard-disk system 102 (FIG. 1) also concern information whose processing integrity is more important than its timeliness. Examples of this type of information are files comprising an application. Handling processing errors cannot be interrupted in these types of processing assignments because this would affect the integrity of the processed information. This is not acceptable. For this reason, this type of information cannot be processed in accordance with the processing flow 400 (FIG. 4).

To simplify the further description of the presented embodiment of the invention, an assignment to process information, in which timeliness of processing is more important than integrity, will be referred to as a real-time or RT assignment. An assignment for processing information, in which integrity is more important than timeliness, is referred to as a best effort or BE assignment. These classifications may be considered to be priority levels. Again, the processing of information comprises storing information in the hard-disk system 102 (FIG. 1) as well as reading information from the hard-disk system 102 (FIG. 1).

As previously stated, the processing flow 400 (FIG. 4) can only be used for RT assignments. FIG. 5 shows a further processing flow 500 for processing cycli with RT and BE assignments. In the presented embodiment of the method according to the invention, this method is performed by the processing unit 101 (FIG. 1). The further processing flows begins at the start 501. In a process 502, the total time required for processing all assignments is determined.

Subsequently, it is tested in a decision 503 whether the time required to handle all assignments in the cycle planning does not exceed the time for a cycle (compare decision 403 in the processing flow 400 (FIG. 4)). If the time required for handling all assignments in the cycle planning exceeds the time of a cycle, a processing assignment which was the last to come in is postponed in a process 521 to a subsequent cycle. Subsequently, the time required to complete all assignments in the cycle planning is tested again. If the time required for completing all processing assignments is shorter than or equal to the time of a cycle, all assignments of the cycle planning are queued up in a process 504. As already stated, it is also possible for an assignment other than the last to be shifted in the process 521.

Subsequently, the spare time of the cycle planning is determined in a process 505. To this end, the sum of the times required to complete all assignments of the cycle planning is subtracted from the cycle time. Moreover, the sum of the time required for completing all BE processing assignments in the queue formed in the process 504 is determined.

Subsequently, a first assignment of the cycle planning is given to the hard-disk system 102 (FIG. 1) in a process 506. The deadline given for completing the first assignment corresponds in the presented embodiment of the invention to the sum of the time required in accordance with the scheduler for completing the first assignment, the spare time and the time required for completing all BE assignments of the cycle planning. The fact that the BE assignments are not time-critical has been taken as a starting point in this case. The advantage of using the time required for completing all BE assignments of the cycle planning is that the maximum time which is not allocated to time-critical assignments can be used for recovering processing errors. In this way, the integrity of RT information is enhanced and the maximum time is offered to ensure faultless handling of BE assignments. However, it is also possible to determine the deadline only with reference to the sum of the time required in accordance with the cycle planning for handling the assignment and the spare time in the cycle planning.

After the first processing assignment of the queue formed in the process 504 is given with the associated deadline to the hard-disk system 102 (FIG. 1), the further processing flow 500 waits for a reaction of the hard-disk system 102 in a process 507. After the hard-disk system 102 (FIG. 1) has finished the assignment and gives feedback to the scheduler 203 (FIG. 2), it is tested in a decision 508 whether the assignment has been processed without errors. If this is the case, feedback is subsequently given to the file system 204 (FIG. 1) in the process 509. Feedback can be given, inter alia, on whether the assignment has been processed successfully. If errors have occurred in processing the assignment, feedback can be given on the occurrence of errors and on the number of errors that has occurred. If the assignment dealt with was a read assignment, the information that has been read will also be fed back to the file system 204 (FIG. 2).

However, if an error has occurred when the assignment is being processed, which error cannot be recovered within the deadline set, it is tested in a decision 523 whether the assignment was a BE or a RT assignment. If the assignment was a RT assignment, the processing flow 500 proceeds to the process 509 and the assignment is terminated. If the assignment was a read assignment, the data of the hard-disk system 102 (FIG. 1) is passed on together with the error to the host 100 (FIG. 1).

If the assignment during which an error has occurred that cannot be recovered within the deadline set was, however, a BE assignment, the complete BE assignment is planned in a process 524 for the next cycle. On planning the cycle, this process has priority to other BE assignments.

If the assignment was a read assignment, the information retrieved from the hard-disk system 102 (FIG. 1) is not passed on to the host 100 (FIG. 1). If the assignment was a write assignment, the information on the disk (not shown) of hard-disk system 102 (FIG. 1) is ignored. After the process 524 the further processing flow 500 proceeds to the process 509.

After the process 509, the processed assignment is removed in a process 510 from the queue formed in the process 504.

After the assignment for the performed processing operation has been removed in the process 510 from the queue formed in the process 504, it is tested in a decision 511 whether the time which is still available in the cycle is sufficient to process all assignments which are still to be processed. If this is not the case, the last BE assignment in the queue formed in the process 503 is planned in a process 525 for the next cycle and removed from the queue. Subsequently, it is tested again in the process 511 whether the time which is still available in the cycle is sufficient to process the assignments which are still in the queue. If this is not the case, the further processing flow 500 proceeds to the process 525. If this is the case, the further processing flow 500 proceeds to a process 512. In the process 512, it is tested whether the queue of processing assignments is empty. If this is the case, the further processing flow 500 comes to an end at an end point 513. If the queue in the process 512 is still not empty, the further processing flow 500 proceeds to the process 505.

As is apparent from the description of the further processing flow 500, it should be known to the scheduler 203 (FIG. 2) whether the processing assignment is a BE or a RT assignment. This is passed on by the application 205 (FIG. 2) via a first Application Protocol Interface (API) 211 to the file system 204 (FIG. 2) which passes it on to the scheduler 215 (FIG. 2) via a second API 213.

Figure 6A:
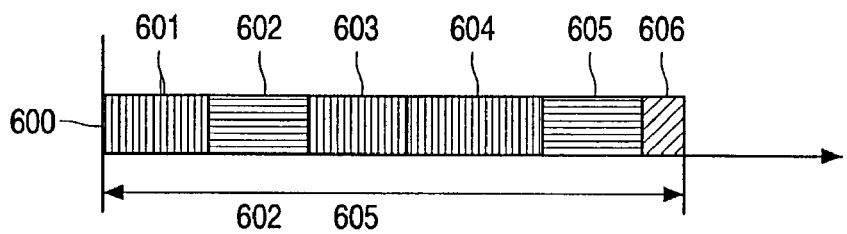
Figure 6B:
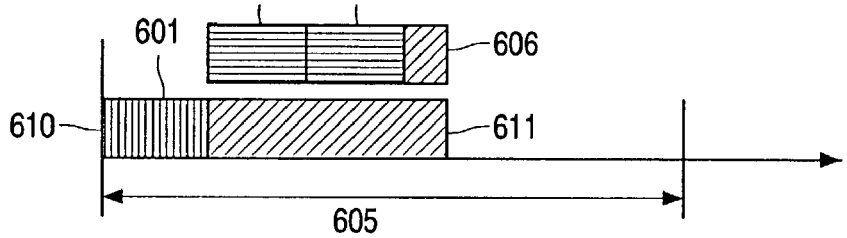

The further processing flow 500 (FIG. 5) is further illustrated with reference to FIG. 6. FIG. 6A shows a cycle planning 600. Planned in this cycle are: a first RT processing assignment 601, a first BE processing assignment 602, a second RT processing assignment 603, a third RT processing assignment 604, a second BE processing assignment 605 and a length of spare time 606. FIG. 6B shows how the first RT processing assignment 601 is given to the hard-disk system 102 (FIG. 1). In the process 505 (FIG. 5) the extra time a processing assignment may occupy has been computed in addition to the time computed by the scheduler for this assignment. The deadline given with the first RT processing assignment is the sum of the time planned for the first RT processing assignment and a time lapse 611 which is computed in the process 505. Time lapse 611 is computed by summing the time determined by the scheduler for processing the two BE assignments in the cycle planning 600 and the spare time 606.

Figure 6C:
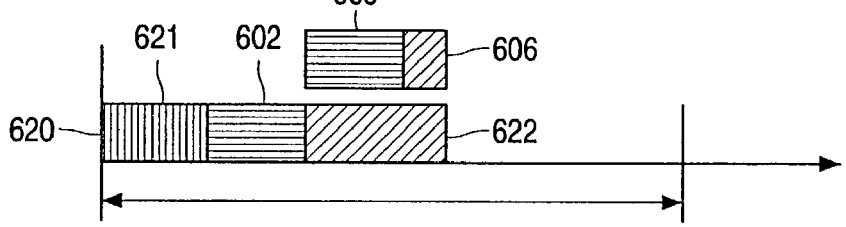
Figure 6D:
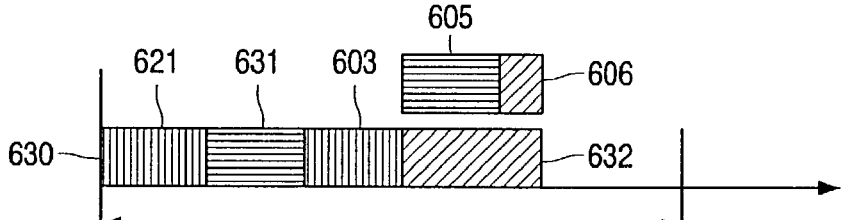

FIG. 6C shows how the first BE processing assignment 602 is given to the hard-disk system 102 (FIG. 1). Time lapse 621 shows the time required by the hard-disk system 102 (FIG. 1) for performing the first RT processing assignment. Since the first RT processing assignment has been completed within the same time as the time reserved for it by the scheduler in the case described here, the spare time is equal to the planned spare time 606. Moreover, it is determined how much time is planned for subsequent BE processing assignments. In the presented case, this is equal to the time planned for the second BE processing assignment 605. In this way, the deadline within which the first BE processing assignment 602 is to be processed, is equal to time lapse 622 plus the time planned for the first BE processing assignment 602.

After completion of the second BE processing assignment 602, which has been effected in a time lapse 631 which the scheduler reserved for it, the second RT processing assignment is given to the hard-disk system 102 (FIG. 1). The deadline given for this assignment corresponds to the sum of the spare time 606, the time planned for the second BE processing assignment 605 and the time planned for the second RT processing assignment 603. As previously stated, it is possible to extend the spare time as a larger number of assignments in the cycle is handled. The reason is that the time planned per assignment is a worst case assignment. If a processing assignment is—faultlessly—completed within the deadline set, the difference between the time required by the hard-disk system 102 (FIG. 1) for completing the processing assignment and the planned time is extra spare time for subsequent processing assignments.

Figure 6E:
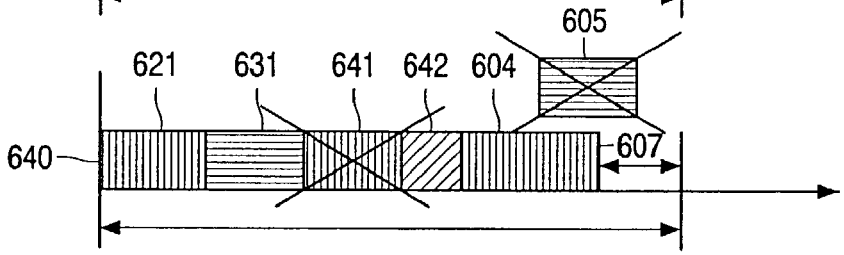

In the presented situation, an error occurs when the second assignment 603 is being processed. The processing assignment is fulfilled in a time lapse 641 and the error which occurs can be recovered in a time lapse 642 which is longer than the spare time 606. Although an error occurs, this error can thus be recovered within the time allocated by the scheduler for performing the assignment. This means that the hard-disk system 102 (FIG. 1) does not give an error message to the scheduler, and the further processing flow 500 (FIG. 5) proceeds to the process 509 after the second RT processing assignment has been performed in the decision 508 (FIG. 5). Subsequently, processes 509 and 510 are performed. In the decision 511 it is tested whether the time still available in the cycle planning after the first three processing assignments have been performed is sufficient to perform the rest of the planned processing assignments. As is shown in FIG. 6E, this is not the case because a time lapse 607 indicating the time available in the cycle for handling the last processing assignment (in this case, the second BE processing assignment 605) is shorter than the time reserved for this last processing assignment.

After the first three processing assignments of the cycle planning 605 have been performed, including the recovery of errors that have occurred, there is thus not enough time left to complete the third RT processing assignment 604 and the second BE assignment 605. For this reason, the further processing flow 500 proceeds to the process 525 after the decision 511. In the process 525, the second BE processing assignment 605 is removed from the queue of assignments. Subsequently, it is tested again in the process 511 whether the time still available in the cycle planning after the first three processing assignments have been performed is sufficient to perform the rest of the planned processing assignments. This is the case after the second processing assignment 605 has been removed.

Figure 6F:
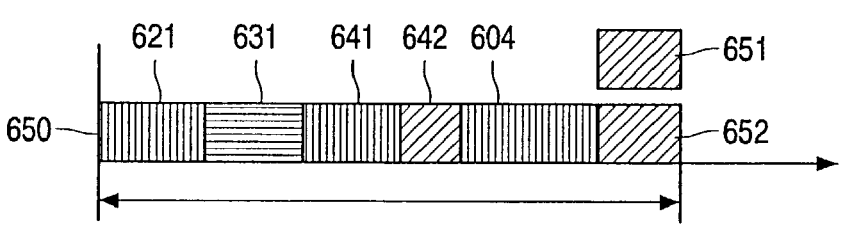
Figure 6G:
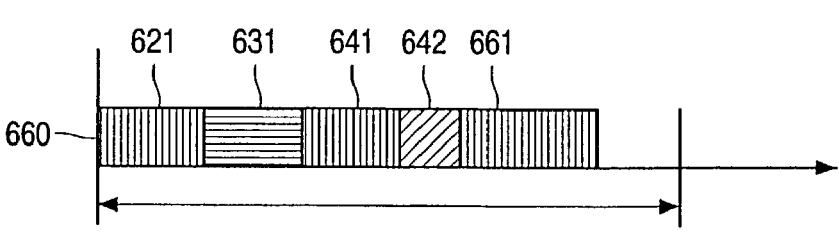

Subsequently, after the process 512, the spare time is recomputed in the process 505. In FIG. 6F, this time is shown as a recomputed spare time 651. Subsequently, the second RT processing assignment is given in the process 506 to the hard-disk system 102 (FIG. 1) with a deadline which corresponds to the time planned for the second RT processing assignment 604 and a time lapse 652 which corresponds to the recomputed spare time 651. In the presented situation, the second RT processing assignment is processed without any errors. FIG. 6G shows how the cycle planning 600 in the presented situation is performed in accordance with the further processing flow 500. A time lapse 621 indicates the time required for processing the first RT processing assignment 601, a time lapse 631 indicates the time required for processing the first BE processing assignment 602, a time lapse 641 indicates the time required for processing the second RT processing assignment 603, a time lapse 642 indicates the time required for recovering an error which occurred when the second RT processing assignment 603 was processed, and a time lapse 661 indicates the time required for processing the third RT processing assignment 604.

The situation presented here is only an example of a situation as may occur in the presented embodiment of the invention. It will be evident to those skilled in the art that the invention has a wider scope than the embodiment presented here.

Hitherto, two examples of planning scenarios have been presented. In the first scenario, a planned cycle only consists of RT processing assignments, and in the second scenario, a planned cycle consists of RT processing assignments and BE processing assignments. If an error occurs in the second case when processing a BE assignment and the error cannot be recovered within the imposed deadline, the entire BE processing assignment is replanned in a subsequent cycle in the presented scenario. In the subsequent cycle, there should be minimally as much space available for processing the postponed BE processing assignment. In fact, the BE processing assignment should be completely performed once again. This means that the first time this BE processing assignment was performed was dead time. As a result, the bandwidth of the hard-disk system has not been used optimally. In yet another embodiment of the invention, the recovery process of solving the processing error is stopped and continued in a subsequent cycle. In this way, an ultimate status of the processing assignment can be found. An embodiment of the method according to the invention can be implemented by means of the ATA-6 protocol.

If the processing error is a soft error, it can be probably solved because the error may have been caused by a vibration of the hard-disk system 102 (FIG. 1), by a temporary synchronization problem or another problem of a temporary nature. The written data may also have a poor quality.

If the processing error is a hard error, such as damage of the hard disk, the hard-disk system 102 (FIG. 1) will ultimately give an error message. With this information, the hard-disk system 102 (FIG. 1) or the file system 204 (FIG. 2) can mark the relevant part of the hard disk as being defective so as to prevent this hard error from leading to a processing error again at a later stage. These two aspects are great advantages within the framework of optimal use of the bandwidth of the hard-disk system 102 (FIG. 1).

To implement this embodiment according to the invention, a small modification is to be made in the further processing flow 500 (FIG. 5). In the further processing flow 500, it is not the entire BE processing assignment that has to be postponed in process 524 (FIG. 5) to a subsequent cycle. Instead, the status of the recovery process should be stored in a cache memory (not shown) in the hard-disk system 102 (FIG. 1) or the host system 100 (FIG. 1), and the further processing of recovering the error should be planned in a subsequent cycle.

In the presented embodiment of the invention, the scheduler is a part of a real-time file system 207 (FIG. 2). In a further embodiment of the invention, the hard-disk system 102 (FIG. 2) comprises the scheduler 203 (FIG. 2).

In the description of the embodiment of the invention which is most preferred, a hard-disk system with a hard disk for magnetically storing information has been described. However, it will be evident to those skilled in the art that the invention is also applicable to storing information in and/or reading information from arbitrary memory systems such as magneto-optical media, optical media such as CD-ROM and DVD and solid-state memories such as Flash, EEPROM, SRAM and ROM memories and in possibly future quantum memories.

In summary, the invention relates to a method of writing data to and reading data from a memory (102) by a host. By limiting processing time, time restrictions regarding the data to be processed can be met. However, this is at the expense of data integrity. By setting time limits for a group (300) of multiple processing assignments and dynamic allocation of time, reserved for error recovery and retries, data integrity can be improved, while time limits can still be met. Furthermore, by attaching priorities to the assignments, multiple types of data can be handled in one group of assignments. For example, assignments with real-time requirements can be put in a group with assignments with best effort requirements. In this way, more flexible planning of processing assignments is possible. The invention also relates to a system for writing data to and reading data from a memory.

What is claimed is:

1. A method of reading data from a memory and writing data to a memory by a host in which an available time for performing a processing assignment is limited by the host the method comprising the steps of:
   providing a first time unit for processing the assignment;
   providing a second time unit for recovering processing errors; and,
   enabling the second time unit to be available for a group of processing assignments comprising said processing assignment wherein the second time unit is computed on the basis of the time consumed by the completed part of the group of processing assignments.

2. The method as claimed in claim 1, wherein the second time unit is determined on the basis of at least one of the following parameters:
   a time limit within which the group of processing assignments should be processed,
   the time required for a single attempt to recover a processing error,
   the sum of the times planned for performing each processing assignment,
   the risk of occurrence of processing errors in the system.

3. The method as claimed in claim 2, wherein knowledge regarding the risk of occurrence of processing errors is gained after manufacture of the memory.

4. The method as claimed in claim 2, wherein the group of processing assignments comprises at least two processing assignments.

5. The method as claimed in claim 1, wherein the second time unit is recomputed after at least one of the processing assignments of the group of processing assignments has been completed.

6. The method as claimed in claim 1, wherein a priority level is coupled to at least one of the processing assignments.

7. The method as claimed in claim 6, wherein the priority level comprises one of the following classifications:
   a first priority at which the requested assignment should be completed within a predetermined time, and
   a second priority at which the requested assignment should be completed without errors.

8. The method as claimed in claim 7, wherein the second time unit is determined on the basis of at least a time allocated to the processing assignments that are still to be processed and have the second priority in the group.

9. The method as claimed in claim 7, wherein at least one processing assignment of the second priority is postponed for processing in a further group, and in that the time spared in a group by postponing at least one of the processing assignments of the second priority is added to the second time unit, resulting in a new value of the second time unit.

10. The method as claimed in claim 7, wherein if a processing assignment of the second priority is not faultlessly completed within a third time unit, which is equal to the sum of the first time unit and the second time unit, the relevant processing assignment is planned in a further group of processing assignments.

11. The method as claimed in claim 7, wherein if a processing assignment of the second priority is not faultlessly completed within a third time unit, which is equal to the sum of the first time unit and the second time unit, the error recovery of the relevant processing assignment of the second priority is planned in a further group of processing assignments.

12. The method as claimed in claim 1, wherein the group of processing assignments is built up of processing assignments concerning different data streams.

13. A system comprising:
   a host; and
   a memory, in which the host is adapted to write data to the memory and read data from the memory, and in which the system is adapted to limit an available time for performing a processing assignment, wherein the system is further adapted to compute the available time by taking the sum of a first time unit, planned for processing the processing assignment, and a second time unit made available for recovering processing errors, the system being further adapted to make the second time unit available for a group of processing assignments, the group comprising said processing assignment, wherein the second time unit is computed on the basis of the time consumed by the completed part of the group of processing assignments.

14. The system as claimed in claim 13, wherein the system is further adapted to recompute the second time unit after at least one of the processing assignments of the group of processing assuagements has been performed.

15. The system as claimed in claim 14, wherein the system is further adapted to couple a priority level to at least one of the processing assignments.

* * * * *